United States Patent [19]

Thompson

[11] 4,297,454
[45] Oct. 27, 1981

[54] MANUFACTURE OF A BLOCK COPOLYMER CONTAINING A POLYETHERAMIDE AND A POLYLACTAM

[75] Inventor: Robert M. Thompson, Wilmington, Del.

[73] Assignee: Suntech, Inc., Philadelphia, Pa.

[21] Appl. No.: 133,370

[22] Filed: Nov. 14, 1979

[51] Int. Cl.$^3$ .............................................. C08L 77/02
[52] U.S. Cl. ..................................... 525/432; 528/324
[58] Field of Search ......................................... 525/432

[56] References Cited

U.S. PATENT DOCUMENTS

| | | | |
|---|---|---|---|
| 4,044,071 | 8/1977 | Nickol | 525/432 |
| 4,045,511 | 8/1977 | Nickol | 525/432 |
| 4,045,512 | 8/1977 | Thompson | 525/432 |
| 4,113,794 | 9/1978 | Thompson | 525/432 |
| 4,136,133 | 1/1979 | Thompson | 525/432 |
| 4,165,346 | 8/1979 | Thompson | 525/432 |
| 4,177,222 | 2/1979 | Thompson | 525/432 |

*Primary Examiner*—Paul Lieberman
*Attorney, Agent, or Firm*—J. Edward Hess; Donald R. Johnson; Patrick C. Baker

[57] ABSTRACT

A method for preparing a block copolymer of an ether free polylactam and a polyetheramide, e.g., poly(4,7-dioxadecamethylene adipamide) involves polymerizing a lactam, e.g., caprolactam, in contact with the polyetheramide. Resulting block copolymer has utility, e.g., as a fiber.

9 Claims, No Drawings

MANUFACTURE OF A BLOCK COPOLYMER CONTAINING A POLYETHERAMIDE AND A POLYLACTAM

BACKGROUND

1. Field of Invention

Present invention is a new and useful process directed to forming a block copolymer. The process is directed to forming a block copolymer of two different amide polymers, having utility, for example, after additional processing, as a fiber. The copolymer comprises blocks of monomeric repeating units of each of the two different amide polymers. One of the amide polymers is a polyetheramide and the other is a polylactam which is inherently ether free. By way of comparison, a copolymer can comprise random sequences of repeating units of each of the aforementioned polymers. The latter is often referred to as a random copolymer. As is known, a block copolymer and a random copolymer formed from the same two compounds will possess different properties.

2. Description of the Prior Art

Melt blending is a generally known method for preparing block copolymer comprising amide polymers. It comprises mixing the two different amide polymers, heating the mixture to a temperature above at least one of the amide polymer's melting point, but below any decomposition temperature and blending the heated polymers at a temperature until a block copolymer is formed. The heating then is stopped and the copolymer is allowed to cool. Such a method is described in U.S. Pat. Nos. 4,136,133, 4,130,602, 4,113,794 and 4,168,602. The information contained in the aforementioned patents is incorporated herein by reference.

Other methods of preparing block copolymers are disclosed in U.S. Pat. Nos. 4,044,071 and 4,045,511, which information is also incorporated herein by reference. In the latter two patents, a block copolymer is prepared by mixing a polyamide (ether-free) and a salt of a prepolyetheramide, heating the mixture at a suitable temperature until the salt polymerizes and the resulting polymer forms blocks with the polyamide.

However, applicant has found that, contrary to one's expectation that a random copolymer would be formed by heating a mixture of a lactam and a polyetheramide, a block copolymer is indeed formed. The expectation of a random copolymer is based on the concept that when e.g., the caprolactam starts to form short chains, amide interchange between the short chains and polyetheramide would occur and form a random structure rather than a block structure.

SUMMARY

Applicant has found that a block copolyamide comprising a polyetheramide and a polylactam can be prepared by polymerizing that lactam, e.g., caprolactam, in contact with a polyetheramide, e.g., poly(4,7-dioxadecamethylene adipamide) to form polylactam in situ and to form block copolyamide by reaction of the polylactam and polyether amide. One of the advantages of applicants method, particularly when a lactam such as caprolacram is used, is that it can be carried out in existing nylon-6 equipment with minimum modifications.

DESCRIPTION

The method involves contacting a mixture of lactam and a polyetheramide at an elevated temperature at which the lactam polymerizes. The temperature is below that at which excessive decomposition of the polyetheramide reactant or block copolymer takes place. Such temperatures are readily determined by a person skilled in the art in the light of the present specification and are maintained until the desired block copolymer of a polylactam and a polyetheramide is formed. The block copolymer can be used as e.g., a fiber.

One of the components used as a starting material in applicant's method is a lactam. A lactam is a cyclic amide which polymerizes without the formation of water. It forms AB type nylons, e.g., nylon-3, nylon-4, nylon-7 and nylon-8 and the like. Generally a lactam is a low melting solid. Examples of lactams include 2,5 diketopiperazine, 2-pyrrolidinone, caprolactam, enantholactam, dodecanolactam, $\beta$-propiolactam and capryllactam. Substituted lactams, such as $\gamma$-methyl caprolactam, $\gamma$-n-propyl caprolactam, $\gamma$-t-butyl caprolactam, $\epsilon$-methyl caprolactam and $\alpha,\alpha$-dimethyl-$\beta$-propiolactam can also be used. Preparation of lactams and their properties are described in *Encyclopedia of Polymer Science and Technology,* Volume 10, Library of Congress Catalog Card Number 64-22188, as well as techniques for polymerizing them. One of the properties of a lactam is that in the molten state it is a good solvent for a polyetheramide.

The other component used as a starting material is a polyetheramide. Preferred are polyetheramides selected from the group having the following structural formulas:

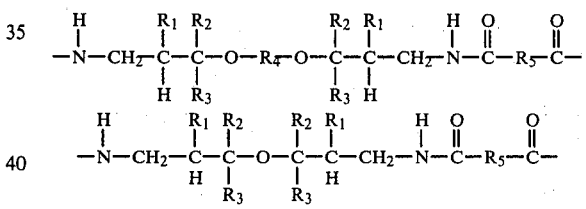

wherein $R_1$, $R_2$ and $R_3$ each are selected from the group consisting of H, $C_1$–$C_{10}$ alkyls, and $C_3$–$C_{10}$ isoalkyls and $R_4$ is selected from the group consisting of $C_1$–$C_{10}$ alkylenes and $C_3$–$C_{10}$ isoalkylenes and $R_5$ is selected from the group consisting of $C_0$–$C_{10}$ alkylenes, $C_3$–$C_{10}$ isoalkylenes, and $C_6$–$C_{20}$ arylenes. Preparations of the foregoing are disclosed in U.S. Pat. Nos. 4,130,602; 4,136,133; and 4,168,002; and the information contained therein is incorporated here by reference. Also disclosed in the patents are the preparations of precursors e.g., salts, used to make the foregoing polymers.

Examples of some of the foregoing polyetheramides includes a more preferred poly-(4,7-dioxadecamethylene adipamide), poly(4,7-dioxadecamethylene sebacamide), poly(4,9-dioxadode-camethylene adipamide), poly(4,8-dioxa-6,6-dimethylundecamethylene adipamide), poly(4,7-dioxa-2,9-dimethyldodecamethylene adipamide), poly(4,7-dioxadecamethylene-2-methyl adipamide), poly(4-oxaheptamethylene adipamide), and poly(4-oxa-2,6-dimethylmonomethylene adipamide).

Generally the amount of each component used to make the block copolymer can vary substantially depending upon the desired block copolymer. Typically, however, the preferred ratio of the lactam to the polyetheramide is in the range of between from about 5 wt.% to about 70 wt.%, with about 10 wt.% to about 40 wt.% more preferred.

Applicant's method can involve placing the lactam in a suitable container, e.g., a reactpr equipped with heating and cooling means and agitation means. Then the lactam is heated to a temperature range between about its melting point and about its polymerization temperature. For caprolactam the melting point is about 68°–69° C. while the polymerization temperature is in the range between from about 230° C. to about 280° C. During the heating the lactam can be agitated to facilitate heat transfer. Once the lactam is molten, solid or molten polyetheramide can be added to the reactor. Generally the solid polyetheramide will be in the form of particles. If, for example, solid poly(4,7-dioxadecamethylene adipamide) is added to molten caprolactam the latter dissolves the former and this is a preferred embodiment of applicant's method. A molten polyetheramide can be prepared by heating it to a temperature above about its melting point but below its decomposition temperature. For poly(4,7-dioxadecamethylene adipamide) the melting point is about 190° C. while the decomposition temperature is at about 280°–290° C. As used herein decomposition refers to the formation of unspecified products as evidenced by e.g., discoloration.

After the mixture of the lactam and polyetheramide is prepared it is heated to a temperature at which the lactam polymerizes. The polymerization temperature is maintained until the desired block copolymer of polylactam and polyetheramide is formed. As is known, polymerization can occur over a wide range of temperatures with the rate of polymerization being relatively slow at a lower temperature while being relatively fast at a higher temperature. However, for any particular combination of starting amide materials there can be an optimum temperature range, depending upon e.g., the equipment used. Further, to reach the preferred polymerization temperature can involve operating at several different levels of temperature. Thus the first level of polymerization temperature can be that at which polymerization occurs. Then a higher temperature is used, which while still in the polymerization range, facilitates more the formation of the blocks. For example, with a mixture of caprolactam and poly(4,7-dioxadecamethylene adipamide) the first temperature can be about 230°–250° C. during which polymerization occurs but the rate of block formation is slow. The second temperature range can be about 250°–280° C. during which the rate of block formation is faster (than the 230°–250° C.) but at which polymerization will occur at a faster rate than at the lower temperature range (230°–250° C.). The foregoing temperature range is also applicable to mixtures of other lactams and other polyetheramides. However, an upper limit to any of the foregoing temperatures is the decomposition temperature of the block copolymer or reactants, which should not be exceeded for a substantial period of time, otherwise degradation occurs causing unwanted reactions with their adverse effect on properties of the resulting product.

During the heating, agitation can be used to facilitate heat transfer, the removal of water if required, and cause intimate contacting between the different amide materials. Also the agitation can assist in the formation of the block copolymer.

Throughout the process the pressure of the system can vary with a vacuum used to enhance the removal of moisture, if any, while pressure is used to suppress the escape of any reactants.

Another vibration of applicant's method is that initially a mixture of particles of the lactam and particles of the polyetheramide is prepared at ambient temperature. After the particles are agitated sufficiently to insure proper mixing the temperature of the mixture is raised to at least about the melting point of the lactam and then thereafter the procedure is as previously described. Still another variation of applicant's method is that the particles of a suitable lactam are added to molten polyetheramide. In this variation the temperature of the molten polyetheramide is such that it causes the lactam to polymerize and then thereafter the procedure is as previously described.

Applicant's method can also be operated on a continuous basis. The lactam can be melted in a line reactor which feeds another line reactor in which molten polyetheramide is flowing. At the junction of the two line reactors mixing can occur and afterwards the temperature of the flowing mixture can, if not already sufficiently high, be increased to the proper elevated temperature or temperatures to cause polymerization and the formation of the block copolymer.

In either the continuous process or batch process, once the block copolymer is formed the material is allowed to cool or is cooled by various means. After cooling the block copolymer can be reduced to particles or used as is for further processing. The latter can include, for example, melt spinning to a continuous filament having utility in textiles.

The amount of time required to form the block copolymer via applicant's method depends on the equipment used, the amount of material processed and other factors. However, too much time can cause the formed block copolymer to gradually evolve into an undesirable random copolymer. However, throughout the process samples can be taken and measurements made on the samples to determine the amount of polymerization and/or the amount of formation of the block copolymer. The latter can be determined by the fractional precipitation of the polymer in formic acid which determination is described in detail in U.S. Pat. Nos. 4,045,511 and 4,045,512, which are incorporated herein by reference.

To further illustrate the invention, the following examples are provided.

EXAMPLES

First, three runs were made in glass tubes to determine whether or not the method would result in a block copolymer. Suitable amounts of solid caprolactam, N30203-6 (poly(4,7-dioxadecamethylene adipamide)), and solid aminocaproic acid (a known initiator) were charged to a large test tube having a rubber stopper with two openings in it. The openings were for a helical stirrer and a nitrogen inlet. The tube was purged of air using nitrogen and afterwards the tube was heated using a suitable liquid-vapor bath. The mixture of the materials was agitated with a helical stirrer powered by an air motor for the required time. Before allowing the molten material to cool the stirrer was lifted from the tube. The amount of each material charged is shown in Table I along with the elevated temperature used and how long the heating lasted.

As shown in Table I the preformed N30203-6 charged to each run had a different viscosity. The different viscosities reflected different chain lengths. The purpose of using different chain lengths was to determine if it would have an effect on the lengths of the block of the resulting polymer. As can be seen from the formic acid solubility (formic acid concentration at 50% recovery) some effect was observed. Run 3 was apparently operated at too low a temperature and for too short a period of time as indicated by the % extractibles. It suggests that much of the lactam never polymerized. The formic acid solubilities for Runs 1, 2 and 3 indicate that blocks were formed since a random polymer would have a value of 33.3 (formic acid concentration at 50% recovery).

TABLE I

| Effect of Various Variables on Block Formation | | | |
|---|---|---|---|
| Run | 1 | 2 | 3 |
| Charge | | | |
| Caprolactam, gms | 28 | 28 | 28 |
| N30203-6 gms | 12 | 12 | 12 |
| N30203-6 viscosity ($\eta$ inh) | 0.26 | 0.74 | 0.89 |
| Aminocaproic acid, gms | 1.35 | 1.35 | 1.35 |
| Operating Conditions | | | |
| Temperature, °C. | 250 | 250 | 190-245 |
| Time hrs. | 5 | 5 | 2-0.5 |
| Product Analysis | | | |
| Viscosity, ($\eta$ inh) | 0.9 | 1.1 | 1.6 |
| Extractables, wt. % | 10 | 19 | 33 |
| Formic Acid Solubilities | | | |
| Formic Acid Con at 50% Rec. | 43.7 | 43.7 | 44.3 |
| Max. Recovery | 95.0 | 96.0 | 93.2 |

The formic acid solubility tests are known and the procedure described in U.S. Pat. No. 3,045,512 was used. The two tests are the formic acid concentration when 50% of dissolved copolymer is recovered and the maximum amount of dissolved copolymer recovered from a standardized formic acid solution.

A two-gallon reactor was charged with 1090 grams of solid poly-(4,7-dioxadecamethylene adipamide) and 2542 grams of solid caprolactam. The polyetheramide was prepared as described in the examples of U.S. Pat. No. 4,130,602 and had a molecular weight of about 30,000 with y having a value of about 111 and z having a value of about 167. Also included in the charge were 18 grams of solid sodium benzene phosphinate, a known antioxidant. The reactor was purged with nitrogen and kept under a nitrogen pressure of 10 psig throughout the run. The stirred contents of the reactor were heated to a temperature of 250° C. at which time a sample was taken. The contents were maintained at a temperature of 250° C. for an additional five hours, during which samples were taken at one hour intervals.

The accompanying Table II lists the results of various tests conducted on samples.

TABLE II

| Effect of Reaction Time on Melting Temperatures of Copolymer | | | | |
|---|---|---|---|---|
| Reaction Time Hrs. | % Extractables | DSC-°C. Initial | True | Peak | Recrystallization Point |
| 1 | 49.6 | 132.5 | 138.0 | 155.5 | — |
| 2 | 41.7 | 158.0 | 171.5 | 187.5 | — |
| 3 | 29.8 | 155.0 | 174.0 | 190.5 | — |
| 4 | 24 | — | 174.0 | 191.5 | 160.0 |
| 5 | 18.9 | — | 171.5 | 187.5 | 158.0 |

The % extractable refers to the amount of monomer or oligomer that remains dissolved in water when the product is washed with boiling water. As can be seen, as the reaction time increases the amount remaining in the water decreases which indicates that more and more of the caprolactam is polymerizing.

The changes in the DSC (differential scanning calorimeter) melting temperatures indicate changes in the amount of blocks formed. Thus as the true DSC temperature increases more and more blocks were formed as a result of transamidation between the formed polycaprolactam and the polyetheramide. However, after about 4 hours of reaction time, the true DSC temperature starts to decrease, indicating that randomness is starting to occur. The true melting point of a commercial nylon 6 is about 220° C.

After the five hours of heating at 250° C. the reactor was cooled to ambient temperature and the product spun into a fiber. The resin had excellent fiber characteristics with reasonable fiber properties and good hydrophilic character.

Use of lactams other than caprolactam and polyetheramides other than poly-(4,7-dioxadecamethylene adipamide) in the foregoing examples will yield similar results.

What is claimed is:

1. Method for preparing a block copolyamide comprising polymerizing a lactam in contact with a polyetheramide to form polylactam in situ to form block copolyamide by reaction of said polylactam and said polyetheramide, wherein at least one of the lactam and polyetheramide are molten during said lactam polymerization and block copolymer formation, the lactam is present in the mixture of lactam and polyetheramide in an amount of about 5 wt.% to about 70 wt.% of said mixture, and the polyetheramide is selected from polymers of the structures:

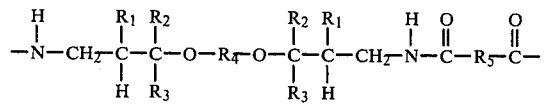

AND

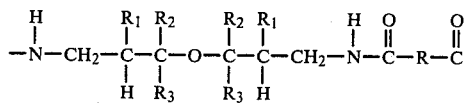

wherein $R_1$, $R_2$ and $R_3$ each are H, $C_1$-$C_{10}$ alkyl or $C_3$-$C_{10}$ isoalkyl, $R_4$ is $C_1$-$C_{10}$ alkylene or $C_3$-$C_{10}$ isolkylene, and $R_5$ is $C_0$-$C_{10}$ alkylene, $C_3$-$C_{10}$ isoalkylene or $C_6$-$C_{20}$ arylene.

2. Method according to claim 1 wherein the temperature is in the range between from about 230° C. to about 280° C.

3. Method according to claim 1 which comprises melting the lactam, dissolving the polyetheramide in the molten lactam and heating the resulting solution to polymerization temperature.

4. Method according to claim 1 which comprises mixing solid lactam and solid polyetheramide and heating the resulting mixture to polymerization temperature.

5. Method according to claim 1 which comprises contacting molten lactam with molten polyetheramide at polymerization temperature.

6. Method according to claim 1 which comprises mixing solid lactam and molten polyetheramide and contacting the resulting mixture at polymerization temperature.

7. Method according to claims 1, 2, 3, 4, 5 or 6 wherein the lactam is caprolactam.

8. Method according to claims 1, 2, 3, 4, 5 or 6 wherein the polyetheramide is poly(4,7-dioxadecamethylene adipamide).

9. Method according to claims 1, 2, 3, 4, 5 or 6 wherein the lactam is caprolactam and the polyetheramide is poly(4,7-dioxadecamethylene adipamide).

* * * * *